United States Patent
Laming et al.

(10) Patent No.: US 6,278,818 B1
(45) Date of Patent: Aug. 21, 2001

(54) OPTICAL COUPLER AND/OR MULTIPLEXER

(75) Inventors: Richard Ian Laming, Edinburgh (GB); Liang Dong, Painted Post, NY (US)

(73) Assignee: University of Southampton, Southampton (GB)

( * ) Notice: Subject to any disclaimer, the term of this patent is extended or adjusted under 35 U.S.C. 154(b) by 0 days.

(21) Appl. No.: 09/403,383

(22) PCT Filed: Apr. 20, 1998

(86) PCT No.: PCT/GB98/01141

§ 371 Date: Feb. 14, 2000

§ 102(e) Date: Feb. 14, 2000

(87) PCT Pub. No.: WO98/48305

PCT Pub. Date: Oct. 29, 1998

(30) Foreign Application Priority Data

Apr. 21, 1997 (GB) .................................................. 9708045
Aug. 11, 1997 (GB) .................................................. 9716970

(51) Int. Cl.[7] .................................................. G02B 6/34
(52) U.S. Cl. .................. 385/37; 385/24; 385/42; 385/43; 359/124; 359/127; 359/130
(58) Field of Search .................. 385/24, 42, 43, 385/37; 359/124, 127, 130

(56) References Cited

U.S. PATENT DOCUMENTS

| | | | |
|---|---|---|---|
| 5,170,450 | * | 12/1992 | Dahlgren .................. 385/42 |
| 5,574,807 | * | 11/1996 | Snitzer .................. 385/24 |
| 5,778,119 | * | 7/1998 | Farries .................. 385/37 |
| 5,805,751 | * | 9/1998 | Kewitsch .................. 385/37 |
| 5,940,556 | * | 8/1999 | Moslehi .................. 385/24 |

FOREIGN PATENT DOCUMENTS

| | | |
|---|---|---|
| 0 435 194 | 7/1991 | (EP) . |
| 62-017709 | * 1/1987 | (JP) . |
| 62-127807 | 6/1987 | (JP) . |
| 97/08574 | 3/1997 | (WO) . |

OTHER PUBLICATIONS

L. Dong, "Novel add/drop filters for WDM optical fiber systems using a Bragg grating assisted mismatched coupler", IEEE Photonics technology Letters, 8(12), pp. 1656–1658, Dec. 1996.*

Patent Abstracts of Japan, vol. 011, No. 194 (P–588), Jun. 23, 1987 —& JP 62 017709 A (Nippon Telegr & Teleph Corp), Jan. 26, 1987, see abstract.

Patent Abstracts of Japan, vol. 011, No. 345 (P–636), Nov. 12, 1987 —& JP 62 127807 A (Furukawa Electric Co LTD:THE), Jun. 10, 1987, see abstract.

L. Dong et al.; "Novel Add/Drop Filters for Wavelength–Division–Multiplexing Optical Fiber Systems Using a Bragg Grating Assisted Mismatched Coupler" IEEE Photonics Technology Letters, vol. 8, No. 12, Dec. 1996, pp. 1656–1658, XP000679542.

* cited by examiner

*Primary Examiner*—Cassandra Spyrou
*Assistant Examiner*—Leo Boutsikaris
(74) *Attorney, Agent, or Firm*—Renner, Otto, Boisselle & Sklar LLP

(57) ABSTRACT

An optical fiber coupler has at least an m-core optical fiber optically coupled to an n-core optical fiber, where m and n are positive integers and m is greater than 1. A channel add/drop multiplexer includes an optical fiber coupler and a Bragg grating disposed on the m-core fiber outside the coupling region.

24 Claims, 4 Drawing Sheets

OPTICAL COUPLER AND/OR MULTIPLEXER

This invention relates to optical couplers and/or multiplexers.

Fused optical fibre couplers, in which two optical fibres are fused together at a coupling region, are known.

JP-A-62 017 709 and U.S. Pat. No. 5,170,450 propose and optical fibre coupler having at least an m-core optical fibre optically coupled to an n-core optical fibre, where m and n are positive integers and m is greater than 1.

In such a coupler, at least one of the fibres involved in the coupler has two or more light-transmitting cores.

In wavelength division multiplexed (WDM) optical transmission systems, multiple information channels are transmitted at different respective wavelengths so that the channels can all be carried on a single waveguide (e.g. an optical fibre).

There is a need in such systems for so-called channel-add multiplexers and so-called channel-drop demultiplexers (these two functions can be combined in a single channel add/drop multiplexer).

A channel add multiplexer is an optical device capable of receiving two optical signals—one generally being a multi-channel WDM signal and the other generally being a new wavelength channel to be added to the WDM signal. These two signals are received at respective input ports of the device, and a composite WDM signal comprising the original WDM signal and the new wavelength channel is supplied at an output port of the device.

Similarly, in a channel drop demultiplexer, a multi-channel WDM signal is received at an input port of the device. One or more of the wavelength channels of the WDM signal is separated from the others and is supplied at a first output port, while the remainder of the WDM signal is supplied at another output port.

Figure 1:
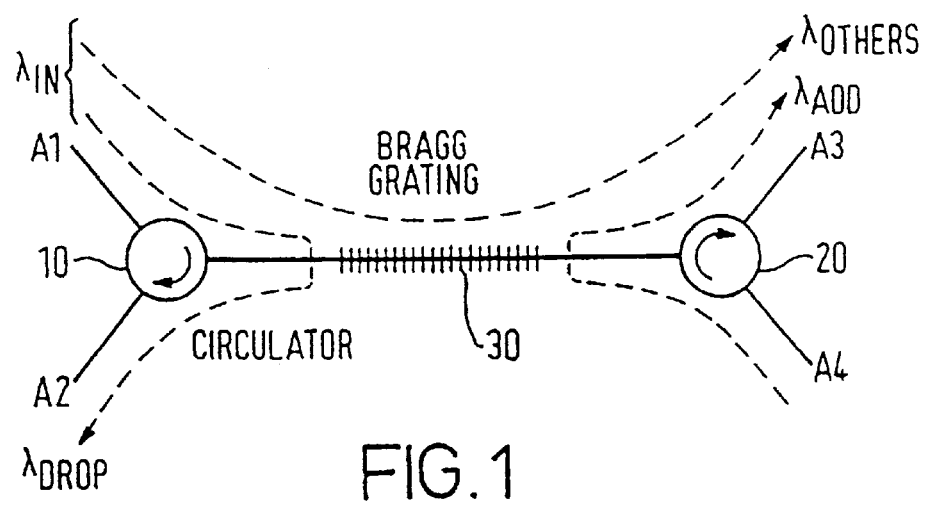

FIG. 1 of the accompanying drawings schematically illustrates a previously prosed optical fibre channel add/drop multiplexer having two input ports A1, A2 and two output ports A3, A4. The device comprises two optical circulators 10, 20 and a fibre Bragg grating 30.

In FIG. 1, a multi-channel WDM signal $\lambda_{IN}$ is launched into port A1. A channel to be added, $\lambda_{ADD}$, is launched into port A4 and a channel $\lambda_{DROP}$ to be separated from the WDM signal $\lambda_{IN}$ is output at port A2. The WDM signal with the channel $\lambda_{DROP}$ dropped and the new channel $\lambda_{ADD}$ is output at port A3.

The device works in a straightforward way. The Bragg grating is arranged. to reflect light at the wavelength $\lambda_{DROP}$ of the channel to be dropped and the channel to be added. So, the channel to be dropped passes from the circulator towards the grating, is reflected by the grating and is output by port A2 of the circulator. Similarly, the channel to be added enters at port A4, passes from the circulator to the Bragg grating where it is reflected, and is output at port A3 of the circulator. The remaining channels of the WDM signal, $\lambda_{OTHERS}$, are unaffected by the Bragg grating and so emerge at port A3 of the circulator.

The device of FIG. 1 makes good use of the wavelength-selective properties of a fibre Bragg grating, but because the grating 30 is a two-port device the multiplexer needs the two circulators 10, 20. Circulators are expensive bulk optical devices, so it is undesirable to use them in an all-fibre system. Also, there are inevitable losses caused by the need to connect fibres to the bulk optical circulators. A simpler device could use two 50:50 fused fibre couplers, but at the expense of an increased insertion loss of 6 dB (decibels) for the add/drop multiplexer.

This invention provides a channel drop demultiplexer comprising an optical fibre coupler having at least an m-core optical fibre optically coupled to an n-core optical fibre, where m and n are positive integers and m is greater than 1 in which:

the fibres are coupled at a coupling region;

a grating is disposed on at least one core of the m-core fibre away from the coupling region;

a core of the m-core optical fibre to a first side of the coupling region provides an input port for a WDM signal;

that core of the m-core fibre, to a second side of the coupling region, provides an output port for a WDM signal; and the grating promotes coupling of light of a channel to be dropped between cores of the m-core fibre.

This invention also provides a channel add multiplexer comprising an optical fibre coupler having at least an m-core optical fibre optically coupled to an n-core optical fibre, where m and n are positive integers and m is greater than 1 in which:

the fibres are coupled at a coupling region;

a grating is disposed on at least one core of the m-core fibre away from the coupling region;

a core of the m-core optical fibre to a first side of the coupling region provides an input port for a WDM signal;

that core of the m-core fibre, to a second side of the coupling region, provides an output port for WDM signal; and the grating promotes coupling of light of a channel to be added between cores of the m-core fibre.

In the invention a channel add multiplexer and a channel drop demultiplexer are provided which do not require expensive and lossy bulk optical devices such as optical circulators but which do not introduce the insertion losses of conventional fused taper couplers.

Embodiment of the invention can provide a way of selectively coupling light into or out of one core of the m-core fibre. Embodiments of the invention can use established simple fused coupler techniques, and can introduce very low (e.g. less than 1 dB) insertion losses for the coupled light.

A exemplary embodiment of the invention comprises a dual core fibre coupled to a single core fibre. If one core of the dual core fibre is substantially identical (in terms of its optical propagation constants) to the core of the single core fibre, light can be made to couple between that core of the dual core fibre and the single core fibre, whereas light in the other core of the dual core fibre is essentially unaffected.

The insertion loss can be very low (e.g. <1 dB or even <0.5 dB), which is much lower than the simple coupler arrangement described in a paper by Bilodeau et al: IEEE Photonics Technology Letters, 7, 1995, pp388–390 and a paper by Bakhti et al: Electronics Letters, 33, 1997, pp803–804. Compared to these prior art devices, embodiments of the invention are not interferometric devices and so there is no need to balance optical path lengths within the devices to a few wavelengths of the light. This makes embodiments of the invention much easier to manufacture.

Again, compared to the paper by Bakhti et al and also WO97/08574, the grating can be written over a length of fibre instead of onto the waist of the coupler. this means that coupler manufacture and grating manufacture are different processes which can reliably be done separately without affecting the other process. In any event, it is difficult to produce a coupler waist of good uniformity over a long length, so any irregularities will affect the grating performance and restricts the length and number of gratings which can be used in the prior art devices. In contrast, in the present embodiments, multiple gratings can be used, of good quality because they are impressed onto fibre rather that onto a coupler waist. Tuning of the gratings e.g. by compression or stretching is also possible, helped by the non-interferometric nature of the embodiments and the high physical strength of fibre away from the coupler waist.

Figures 2A, 2B:
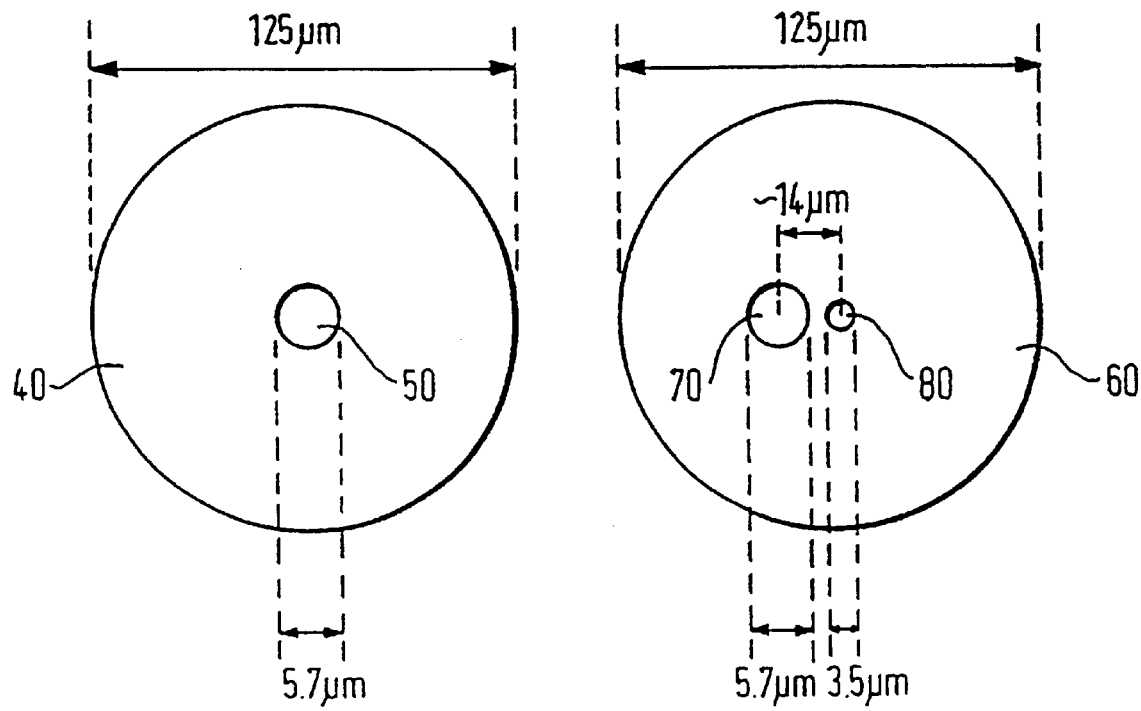
Figure 3:
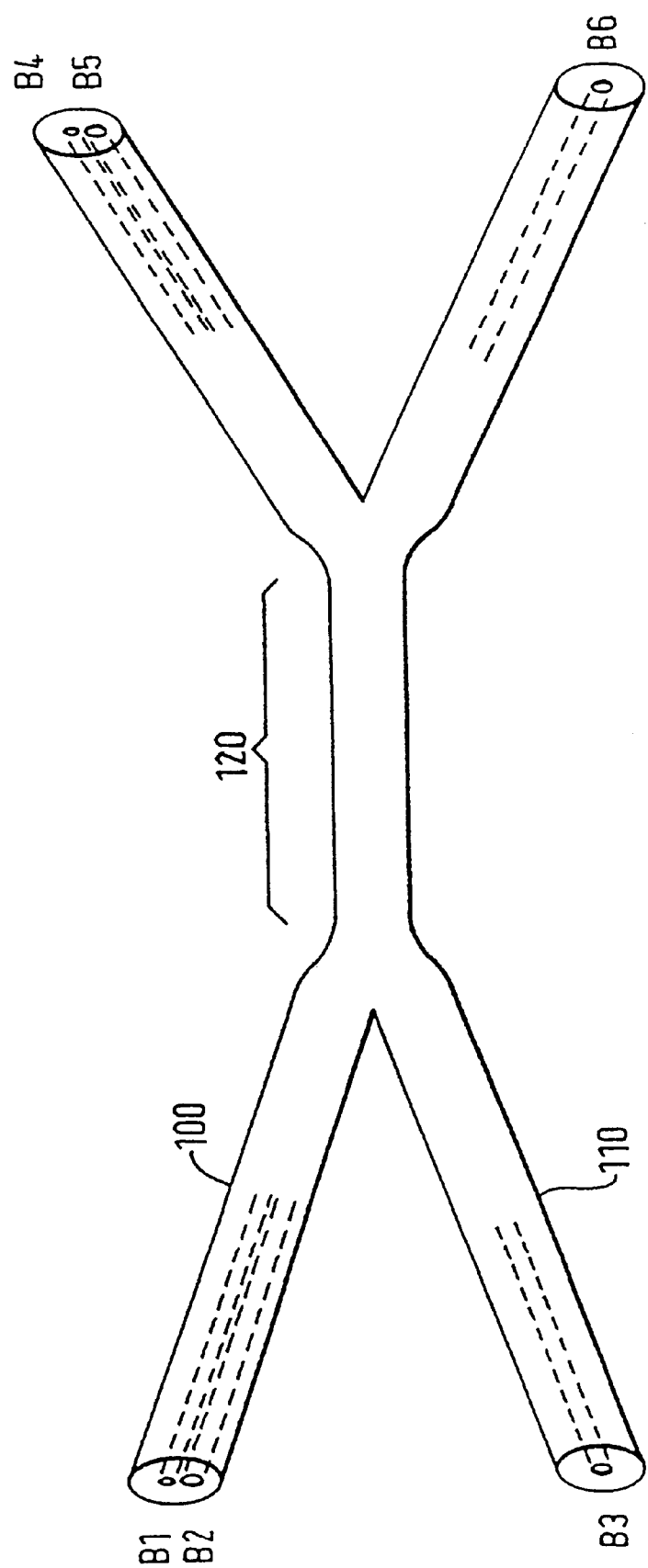
Figure 4:
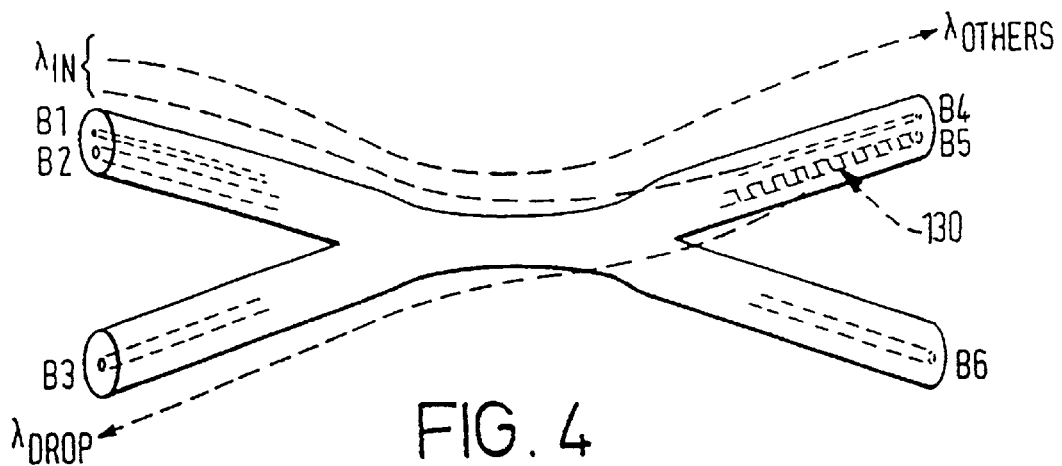
Figure 5:
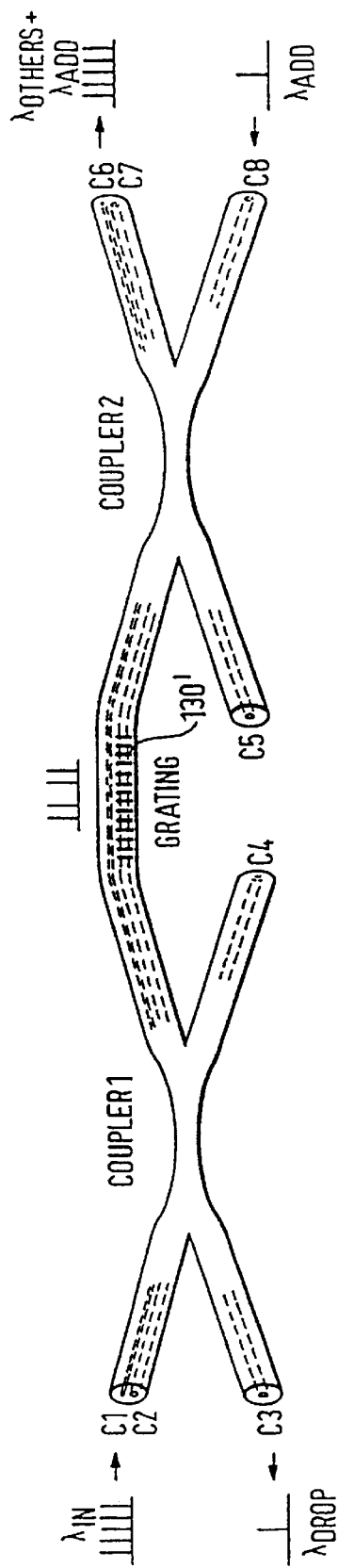

Embodiment of the invention will now be described, by way of example only, with reference to the accompanying drawings, throughout which like parts are referred to by like references, and in which:

FIG. 1 schematically illustrates a previously proposed channel add/drop multiplexer;

FIGS. 2a and 2b schematically illustrate cross sections through optical fibres;

FIG. 3 schematically illustrates a coupler formed of the fibres shown in FIGS. 2a and 2b;

FIG. 4 schematically illustrates a channel drop demultiplexer using a coupler as shown in FIG. 3;

FIG. 5 schematically illustrates a channel add/drop multiplexer; and

Figure 6:
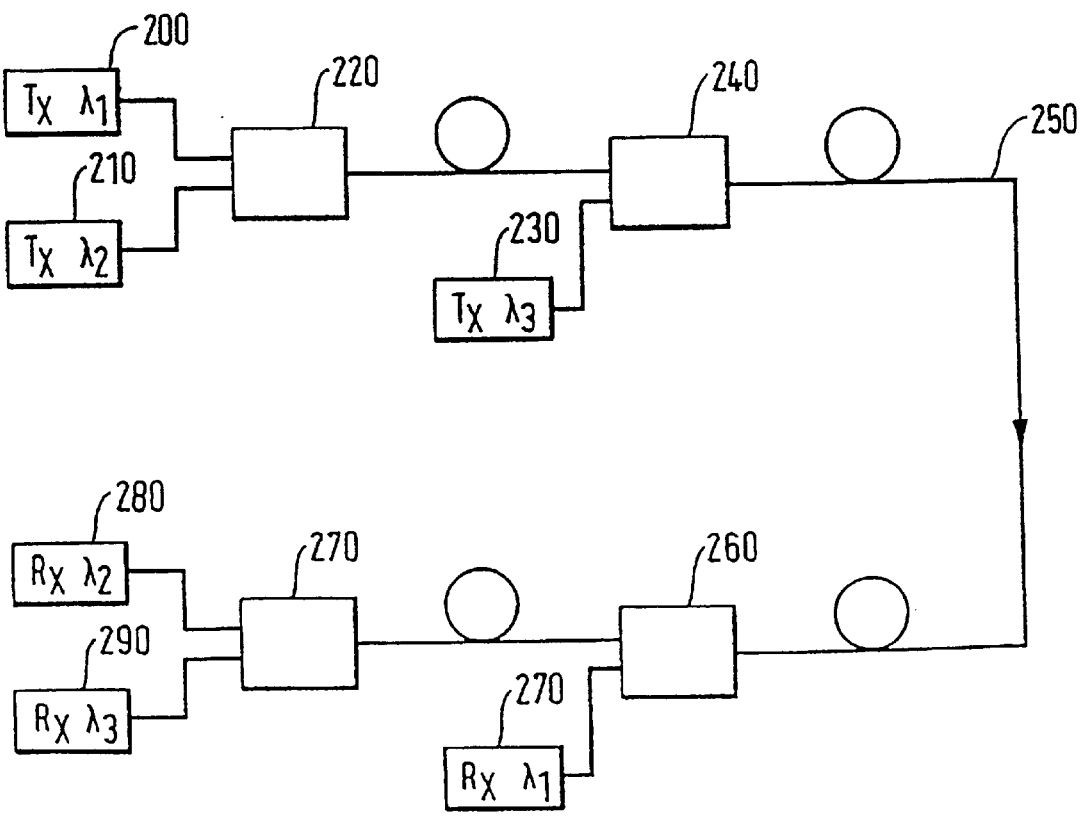

FIG. 6 schematically illustrates an optical transmission system.

FIGS. 2a and 2b schematically illustrate cross sections through two respective optical fibres used in the devices described below.

FIG. 2a illustrates a conventional single-mode optical fibre having a cladding region 40 surrounding a core 50. The core in this embodiment has a numerical aperture (NA) of 0.14, and is formed of boron and germanium doped silica glass.

The fibre shown in FIG. 2b has cladding region 60 similar to the cladding 40 of the fibre of FIG. 2a, surrounding two cores 70, 80 disposed about 14 µm apart. The core 80 is substantially central in the fibre and has an NA of 0.25 and is formed of phosphorus and germanium doped silica glass. The other core 70 is non-axial (off-centre), has an NA of 0.14 and is formed of boron and germanium doped silica glass (i.e. it is similar to the core 50).

Accordingly, FIG. 2a illustrates a single core (SC) fibre and FIG. 2b illustrates a dual core (DC) fibre. The two cores of the DC fibre are mismatched with respect to the other, although one of them is matched to the core of SC fibre. One core of the DC fibre is also axial to facilitate easy connection to standard telecommunication fibre.

FIG. 3 schematically illustrates a fused taper coupler formed by fusing together a length of DC fibre 100 and a length of SC fibre 110 at a coupling region 120. This forms a six-port device having ports B1 . . . B6.

The transmission properties of this six-port device, when light is launched into any one of ports B1 . . . B3, are shown in the follwing tables:

TABLE 1

Results measured at a wavelength of 1.51 µm

| input port | output at port B4 | output at port B5 | output at port B6 |
|---|---|---|---|
| 1 | >95% | <1% | <5% |
| 2 | <1% | <6% | >94% |
| 3 | <1% | >96% | <4% |

The device of FIG. 3 is symmetrical so the following results also apply:

TABLE 2

| input port | output at port B1 | output at port B2 | output at port B3 |
|---|---|---|---|
| 4 | >95% | <1% | <5% |
| 5 | <1% | <6% | >94% |
| 6 | <1% | >96% | <4% |

Thus, light launched into port B2 (the larger core of the DC fibre) emerges preferentially at port B6, whereas light launched into port B1 (the smaller core of the DC fibre) emerges preferentially at port B4.

A number of uses can be envisaged for such a coupler. One such use as part of a channel drop, a channel add or a channel add/drop multiplexer, will be described below.

FIG. 4 schematically illustrates a channel drop multiplexer comprising a coupler of the type shown in FIG. 3 with a Bragg grating 130 impressed on one of the fibre cores using standard grating writing techniques. In the example of FIG. 4, the grating is impressed on the larger core of the DC fibre between the coupling region 120 and the port B5.

A WDM input signal having a range of wavelength channels ($\lambda_{IN}$) is launched into port B1. Those wavelengths unaffected by the Bragg grating ($\lambda_{OTHERS}$), the light emerges at port B4 according to the results shown in Table 1.

However, the grating 130 has the effect of coupling light, at the wavelength $\lambda_{DROP}$ of a channel to be dropped, from the core leading to port B4 (the central, narrower core of the DC fibre) into the core leading to port B5 (the wider, off-centre core of the DC fibre) but in a reverse propagation direction. Accordingly, it is as though the light was entering from port B5, and so according to Table 2 above, the dropped channel $\lambda_{DROP}$ emerges from port B3.

The coupling condition for the grating 130 to have this effect is as follows:

$$\beta_1(\lambda) + \beta_2(\lambda) = \frac{2\pi}{\Lambda}$$

where $\beta_1$ and $\beta_2$ are the propagation constants of the central core and the non-central core respectively.

The grating 130 can in fact be fabricated as a series arrangement of two or more gratings having different periods or the same periods, so that two or more channels can be dropped by the same device and/or the dropped channel can be "cleaned up" (attenuated) by a second grating at the same pitch.

The grating 130 is disposed in the off-centre core of the DC fibre, so that for wavelengths at which the grating does not cause coupling from one fibre to another, the grating has little or no effect on the forward propagation of the non-dropped channels $\lambda_{OTHERS}$. A particular resonance is at $\lambda$ when $$2\beta_1(\lambda) = \frac{2\pi}{\Lambda}$$

This will cause a reflection at $\lambda$ back down the central core, therefore causing a loss for the channel at $\lambda$. By writing the grating into the off-centre core, this reflection is reduced.

FIG. 5 schematically illustrates a channel add/drop multiplexer formed, in effect. by a back-to-back arrangement of two couplers of the type shown in FIG. 3 with a grating disposed on one of the cores between the two couplers.

The device of FIG. 5 is an eight-port device having ports numbered C1 . . . C8. The initial WDM signal is launched into port C1, representing the central, narrower core of the DC fibre (equivalent to port B1 of the device of FIG. 3). A dropped channel $\lambda_{DROP}$ emerges from port C3. A channel to be added, $\lambda_{ADD}$ is launched into port C8 and the non-dropped channels of the original WDM signal ($\lambda_{OTHERS}$) along with the added channel $\lambda_{ADD}$ emerge from port C6.

The channel dropping arrangement is identical to that shown in FIG. 4. A grating 130' in the non-central core of the DC fibre causes coupling from the central core into the non-central core, in a reverse direction at the wavelength $\lambda_{DROP}$. This light is then coupled back to the port C3 as described above.

Similarly, the channel to be added, $\lambda_{ADD}$, is launched into port C8. This is equivalent to light being launched into port B6 of FIG. 3, and from Table 2 it can be seen that the light emerges at port B2 of FIG. 3, i.e. in the off-centre core of the DC fibre. Light propagating (from right to left as shown) in this core impinges on the grating 130', which couples the light into a reverse-propagating (with respect to the original direction of the added channel) signal in the central core. This reverse-propagating light (in fact, now propagating from left to right in FIG. 5) emerges from the port C6 of the device.

The channels unaffected by the grating, $\lambda_{OTHERS}$, pass through both couplers and emerge from the port C6.

In other embodiments, the grating could be (or include) a chirped grating, such as a linearly chirped grating, to give a similar response over a range of channels or to provide dispersion compensation.

FIG. 6 schematically illustrates an optical transmission system using channel add/drop multiplexers of the type shown in FIG. 4 or 5.

In FIG. 6, two optical transmitters 200, 210 at wavelengths $\lambda_1$ and $\lambda_2$ respectively are combined at a channel add multiplexer 220. A further channel from as transmitter 230 (wavelength $\lambda_3$) is added at a channel add multiplexer 240. The combine WDM signal then propagates through a length of fibre 250 before light at $\lambda_1$ is removed by a channel drop demultiplexer 260, to be received by an optical receiver 270. The remaining light continues to propagate to a channel drop demultiplexer 270 which separates the wavelengths $\lambda_2$ and $\lambda_3$ for reception by respective receives 280, 290.

While the embodiments described above have related to a 2 core fibre coupled to a 1 core fibre, in general other numbers of cores can be used, so long as at least one fibre has more than one core. So, for example, a 3 core fibre could be coupled to a 2 core fibre, and the grating could be impressed on a subset (possibly greater than 1) of the cores of one fibre. Of course, if multi-core fibres are used some of the cores could be arranged as unconnected "dummy" cores.

What is claimed is:

1. A channel drop demultiplexer comprising an optical fiber coupler having at least an m-core optical fiber optically coupled to an n-core optical fiber, where m and n are positive integers and m is greater than 1 in which:
   the fibers are coupled at a coupling region;
   a grating is disposed on at least one core of the m-core fiber away from the coupling region;
   a core of the m-core optical fiber to a first side of the coupling region provides an input port for a WDM signal;
   that core of the m-core fiber, to a second side of the coupling region, provides an output port for a WDM signal; and
   the grating promotes coupling of light of a channel to be dropped between cores of the m-core fiber.

2. A channel drop demultiplexer according to claim 1, in which
   the grating is disposed in the m-core fiber to the second side of the coupling region, the grating promoting reverse direction coupling of light of a channel to be dropped between cores of the m-core fiber; and
   a core of the n-core fiber, to the first side of the coupling region provides an output port for the dropped channel.

3. A channel add multiplexer comprising an optical fiber coupler having at least an m-core optical fiber optically coupled to an n-core optical fiber, where m and n are positive integers and m is greater than 1 in which:
   the fibers are coupled at a coupling region;
   a grating is disposed on at least one core of the m-core fiber away from the coupling region;
   a core of the m-core optical fiber to a first side of the coupling region provides an input port for a WDM signal;
   that core of the m-core fiber, to a second side of the coupling region, provides an output port for a WDM signal; and
   the grating promotes coupling of light of a channel to be added between cores of the m-core fiber.

4. A channel add multiplexer according to claim 3, in which
   the grating is disposed in the m-core fiber to the first side of the coupling region, the grating promoting reverse direction coupling of light of a channel to be added between cores of the m-core fiber; and
   a core of the n-core fiber, to the second side of the coupling region provides an input port for the channel to be added.

5. A channel add/drop multiplexer comprising:
   a channel drop demultiplexer according to claim 1;
   series-connected with:
   a channel add multiplexer according to claim 3.

6. A channel add/drop multiplexer according to claim 5, in which a common grating disposed between the channel add multiplexer and the channel drop demultiplexer performs the function of the grating of the channel add multiplexer and the grating of the channel drop demultiplexer.

7. A multiplexer or demultiplexer according to claim 1 or 3, in which the grating comprises two or more grating sections having different grating periods to promote optical coupling at different respective wavelengths.

8. A multiplexer or demultiplexer according to claim 1 or 3, in which the grating comprises two or more grating sections having substantially identical grating periods.

9. A multiplexer or demultiplexer according to claim 1 or 3, in which the cores of the m-core fiber have different propagation constants.

10. A multiplexer or demultiplexer according to claim 1 or 3, in which m=2 and n=1.

11. A multiplexer or demultiplexer according to claim 1 or 3, in which one of the cores of the m-core fiber has a propagation constant substantially identical to the propagation constant of a core of the n-core fiber.

12. A multiplexer or demultiplexer according to claim 1 or 3, in which the or each grating comprises a periodic refractive index variation.

13. A multiplexer or demultiplexer according to claim 12, in which the or a grating comprises a chirped grating.

14. A multiplexer or demultiplexer according to claim 13, in which the or a grating comprises a linearly chirped grating.

15. A multiplexer or demultiplexer according to claim 1 or 3, in which one of the cores of the m-core optical fiber is disposed substantially axially within the m-core fiber, the or each grating being impressed on another of the core of the m-core fiber.

16. A multiplexer or demultiplexer according to claim 1 or 3, in which the fibers are fused together at the coupling region.

17. A multiplexer or demultiplexer according to claim 1 or 3, in which the or each grating is impressed on the core of the m-core fiber having a propagation constant substantially identical to the propagation constant of a core of the n-core fiber.

18. An optical transmission system comprising a multiplexer according to claim 3 or a demultiplexer according to claim 1.

19. A wavelength-division-multiplexed optical transmission system comprising two or more series-connected multiplexers according to claim 3, each multiplexer being arranged to add one or more respective wavelength channels to a wavelength-division-multiplexed optical signal.

20. A wavelength-division-multiplexed optical transmission system comprising two or more series-connected multiplexers according to claim 1, each demultiplexer being arranged to remove one or more respective wavelength channels from a wavelength-division-multiplexed optical signal.

21. A channel add/drop multiplexer comprising:
a channel drop demultiplexer according to claim 2;
series-connected with:
a channel add multiplexer according to claim 4.

22. A channel add/drop multiplexer according to claim 21, in which a common grating disposed between the channel add multiplexer and the channel drop demultiplexer performs the function of the grating of the channel add multiplexer and the grating of the channel drop demultiplexer.

23. A method of wavelength division demultiplexing, comprising:
providing an optical fiber coupler having at least an m-core optical fiber optically coupled a an n-core optical fiber, where m and n are positive integers and m is greater than 1;
coupling the m-core optical fiber and the n-core optical fiber at a coupling region;
disposing a grating on at least one core of the m-core fiber away from the coupling region;
providing an input port for a WDM signal, said input port being formed by a portion of a core of the m-core optical fiber arranged at a first side of the coupling region;
providing an output port for a WDM signal, said output port being formed by a further portion of said core of the m-core optical fiber arranged to a second side of the coupling region; and
coupling light of a channel to be dropped between cores of the m-core fiber with the grating, thereby to perform channel drop demultiplexing.

24. A method of wavelength division multiplexing, comprising:
providing an optical fiber coupler having at least an m-core optical fiber optically coupled to an n-core optical fiber, where m and n are positive integers and m is greater than 1;
coupling the m-core optical fiber and the n-core optical fiber at a coupling region;
disposing a grating on at least one core of the m-core fiber away from the coupling region;
providing an input port for a WDM signal, said input port being formed by a portion of a core of the m-core optical fiber arranged at a first side of the coupling region;
providing an output port for a WDM signal, said output port being formed by a further portion of said core of the m-core optical fiber arranged to a second side of the coupling region; and
coupling light of a channel to be added between cores of the m-core fiber with the grating, thereby to perform channel add multiplexing.

* * * * *